UNITED STATES PATENT OFFICE.

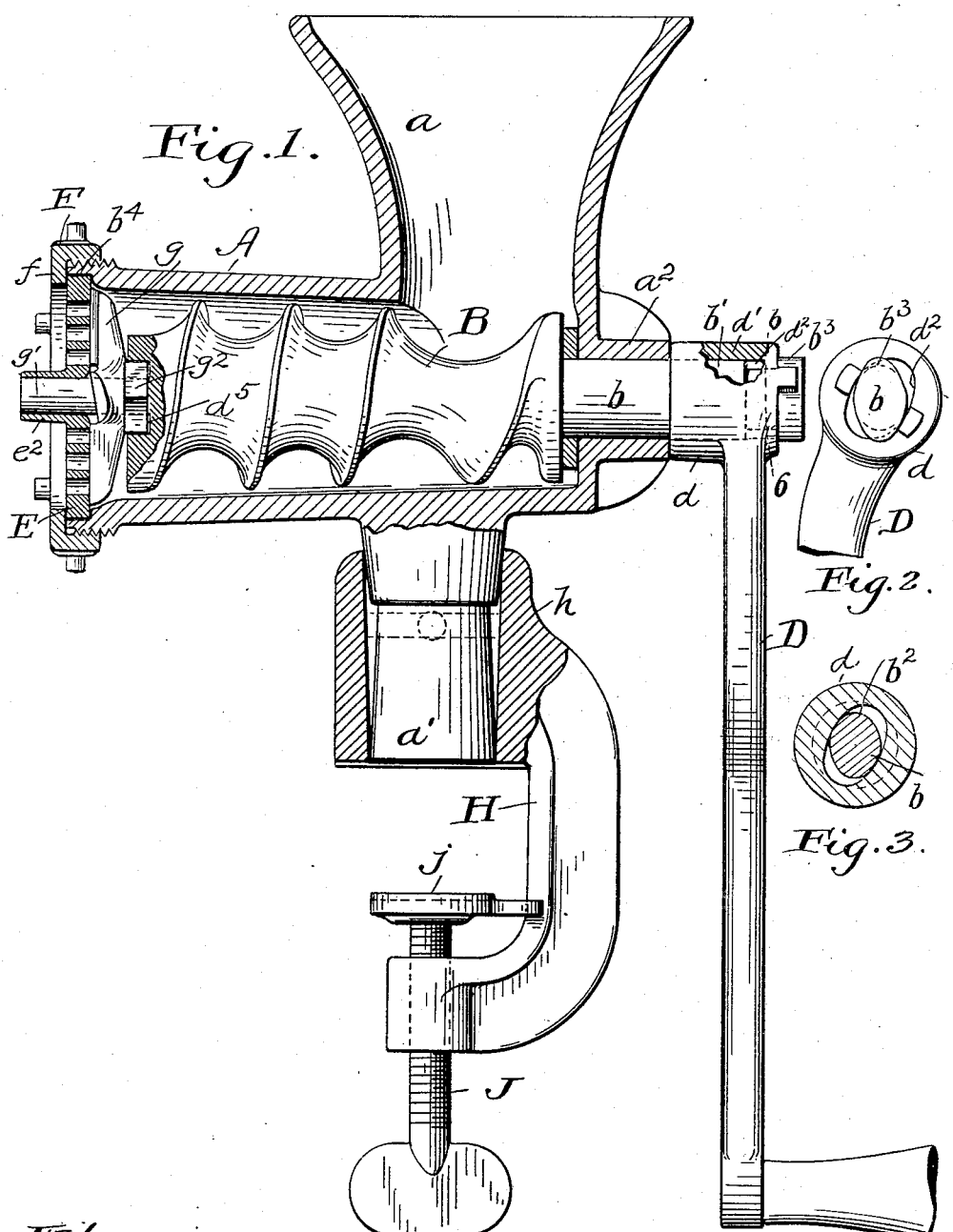

ALONZO MANHARD, OF CLEVELAND, OHIO, ASSIGNOR TO THE CLEVELAND ELECTRIC AND MACHINE MANUFACTURING COMPANY, OF CLEVELAND, OHIO, A CORPORATION OF OHIO.

HANDLE.

1,213,227.      Specification of Letters Patent.      Patented Jan. 23, 1917.

Application filed June 1, 1914. Serial No. 841,997.

*To all whom it may concern:*

Be it known that I, ALONZO MANHARD, a citizen of the United States, residing at Cleveland, in the county of Cuyahoga and State of Ohio, have invented a certain new and useful Improvement in Handles, of which the following is a full, clear, and exact description.

This invention relates to the kind of meat choppers which include a casing adapted to be secured to a suitable support or table, and provided with a feed hopper, a feed screw rotatably mounted in said casing, a perforated plate closing the discharge end of the casing, and a knife within the casing, rotatable with the feed screw in contact with the inner face of the plate. It is essential that meat choppers of this sort be constructed so that they can be readily disassembled in order that their constituent parts may be thoroughly cleansed, and readily assembled again for use.

The primary object of this invention is to facilitate the assembling and disassembling of the parts; and at the same time to make them more durable.

The invention consists in the construction and combination of parts which are hereinafter described and pointed out definitely in the claim.

In the drawing Figure 1 is a longitudinal vertical section through a meat chopper in which the present invention is embodied. Fig. 2 is an end view of the feed screw shaft and the crank handle sleeve; Fig. 3 is a sectional view on the line 6—6 of Fig. 1.

Referring to the parts by letters, A represents the casing, and $a$ the feed hopper therefor, and $a^1$ a downwardly projecting stud which is cylindrical in horizontal section and is formed integral with the casing.

B represents the feed screw which is located within the casing and is rotatable therein. The feed screw shaft $b$ is rotatively mounted in a bearing sleeve $a^2$ which is a part of the casing, and projects a considerable distance out beyond said sleeve. A part of the projecting end of this shaft is cylindrical, as at $b^1$, and this part fits within the cylindrical part $d^1$ of the sleeve $d$ of the crank handle D. A part of the shaft $b$ near the outer end thereof, but still within the sleeve $d$ of the handle is of reduced diameter, and it is oval in cross section, as indicated by the part $b^2$ shown in Fig. 6. That part of the sleeve $d^1$ which surrounds this part $b^2$ of the shaft is provided with an inwardly extended flange $d^2$ whose inner periphery is of oval shape.

That end of the shaft $b$ which projects beyond the sleeve $d$ of the handle is provided with an oval shaped button $b^3$, of such external configuration and size that it may pass through the correspondingly shaped opening through the flanged part $d^2$ of the handle sleeve. The crank handle sleeve is slipped over the projecting end of the shaft $b$, when both are in such relative positions that the oval button shaped end of the shaft will pass through the oval opening in the flange $d^2$. When, now, the handle sleeve is turned relative to the shaft, the ends of the button will overlap the flange $d^2$ and thereby the removal of the handle will be prevented. Likewise the oval shaped part $b^2$ of the shaft will now come into contact with the oval hole through the flange $d^2$, because it cannot turn completely around therein, and thereafter the turning of the handle sleeve will necessarily produce a turning movement of the feed screw $b^2$.

In the open discharge end of the casing is a rabbeted recess $b^4$, for the reception of the perforated plate E. The perforated plate E is a circular disk, except that it has one flat side $e$ of considerable extent,—and preferably it has two parallel flat sides $e, e^1$, as shown in Fig. 4. The rabbeted recess $b^4$ in the discharge end of the casing is correspondingly shaped, and of such size that the plate will fit therein. The engagement of the flat sides of the plate and recess, will prevent the plate from turning.

The knife G has four radial blades $g$, a cylindrical stem $g^1$, which is rotatably mounted in a sleeve $e^2$ which is on the outside of and an integral part of the plate E. On the inner end of this knife is a squared boss $g^2$ which goes into a squared recess $g^5$ in the end of the feed screw. A ring nut F which screws onto the end of the casing has an inwardly turned flange $f$ which engages the outer face of the plate E and thereby holds the parts in the described position.

The clamping member H is in the shape of a yoke whose upper end is fashioned to form the socket $h$ for the reception of the stem $a^1$ of the casing; and a set screw K, which screws through the wall of the socket into contact with this stem furnishes the means for preventing the stem from turning in the socket. A clamping screw J screws vertically through the lower end of the yoke, and has the clamping plate $j$ upon its upper end. This clamping device is of familiar construction, except for the socket piece on its upper end.

If the clamp be placed near the corner of a table, the casing may be so turned in the socket that a man may conveniently use his right hand to turn the crank handle. If, however, the casing be turned so that the crank handle extends down by the edge of the adjacent side of the supporting table, it will be conveniently placed for use of a left handed man. When any given use of the device is terminated, the nut F is removed, the handle is turned relative to shaft $b$, so as to permit it to be removed therefrom. The knife, plate and feed screw may now be taken out of the casing, and the casing may be removed from the clamp socket. It is not necessary to frequently wash the clamp, and the removal of the casing which does require cleansing, permits it to be cleansed without at the same time washing the clamp. When the parts are to be reassembled, the feed screw is put into the casing; the knife is mounted in the plate; and then the plate is put into the open end of the casing, so that either of the arc shaped sides thereof shall be uppermost. If sometimes one arc shaped side is put uppermost, and sometimes the other, that will obviously average up the wear on the plate from the knives, and that will increase the useful life of the plate. When the plate E is put into the end of the casing, care is taken to have the squared end $g^2$ of the knife go into the squared socket $d^5$ in the feed screw. Then the flanged nut F is screwed on; the stem $a^1$ is put into the clamp socket, and secured in the desired position; and then the handle is put onto the projecting end of the shaft $b$; all of which puts the machine in condition for use.

Having described my invention, I claim:

The combination of a bearing sleeve, a shaft which is rotatably mounted in said sleeve and projecting beyond the sleeve said shaft having near its outer end a portion which is reduced in size and which is of oval form in cross section and having at its extreme end a larger oval button shaped end, a crank handle having a sleeve with an opening which is cylindrical a part of the way through to fit upon the cylindrical shaft and which has an inwardly extending flange near its outer face, the inner periphery of which flange is oval and of such size as will permit the button shaped end of the shaft to pass through it but will not permit the oval shaped part of the shaft to turn completely around it.

In testimony whereof, I hereunto affix my signature in the presence of two witnesses.

ALONZO MANHARD.

Witnesses:
E. L. THURSTON,
L. I. PORTER.